April 12, 1966   A. K. SMITH   3,246,117
WELDING
Filed Dec. 16, 1963
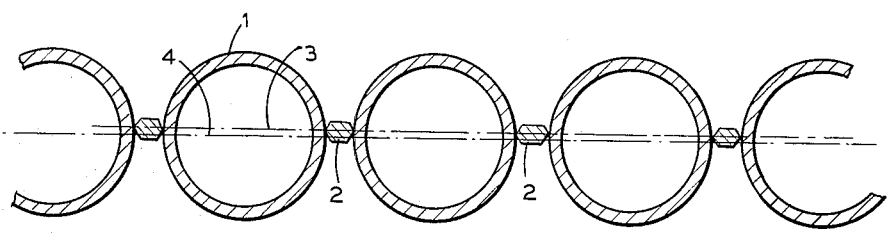
INVENTOR.
Allan K. Smith
BY
ATTORNEY

United States Patent Office 3,246,117
Patented Apr. 12, 1966

3,246,117
WELDING
Allan K. Smith, London, England, assignor to Babcock & Wilcox Limited, London, England, a British company
Filed Dec. 16, 1963, Ser. No. 330,963
Claims priority, application Great Britain, Dec. 17, 1962, 47,504/62
7 Claims. (Cl. 219—137)

In boiler construction, it is becoming increasingly common to form the boiler walls on site from tube panels pre-formed in the workshop. The panels may consist of tubes welded to spacers interposed between them or directly to each other, in which case fins may advantageously be formed on the tubes to facilitate the deposition of the weld metal between the tubes.

In a known method of constructing such panels, the tubes, or the tubes and spacers, of the panel are supported in an array in the juxtaposition that they will have in the panel and are then welded together by a submerged arc process in which welding apparatus is moved progressively along the panel. The means for supporting the tubes, or the tubes and spacers, is generally in the form of a bed on which the components extend horizontally and it is necessary that the initial fit-up of the components on the bed should be within fairly close tolerances if the welds produced by the submerged arc process are to be satisfactory. Working to the necessary tolerances demands time and skill in the initial fitting-up of the work and both add to the expense of the process.

It is an object of the invention to provide a method of constructing a tube panel in which such close tolerance need not be observed.

According to the present invention, there is provided a method of constructing a tube panel in which the tubes, or the tubes and spacers, of the tube panel are supported in an array in the juxtaposition that they will have in the tube panel, the tubes, or the tubes and spacers, are welded each to the next on one side of the array by a short circuit, gas shielded process, the array is reversed and subsequently the tubes, or the tubes and spacers, are welded each to the next on the other side of the array by a spray transfer, gas shielded process.

Welds produced by short circuit, gas shielded processes are not deeply penetrating so that the tolerances with which the tubes, or the tubes and spacers, are initially fitted up may be comparatively wide before a risk of burn-through is introduced. Welds produced by a spray transfer, gas shielded process are more deeply penetrating, but the weld metal deposited by the short circuit technique provides a backing sufficient to prevent blow-through.

By way of example, an embodiment of the invention will now be described with reference to the accompanying drawing which shows in end view a part of an array of alternate tubes and spacers set up for welding into a panel.

The tubes 1 and spacers 2 shown in the drawing are set up on a bed in the juxtaposition that they will have in the welded panel. The bed may, for instance, include a number of transverse beams having arcuate recesses in their upper edges. The tubes 1 lie in the recesses and the spacers 2 are supported on bars extending lengthwise of the bed between the recesses. The configuration of the transverse beams is such that the centre line 3 of the spacers is slightly higher than the centre line 4 of the tubes.

In the particular array indicated in the drawing, the tubes 1 are of 2½" outer diameter on a 3" pitch and the separation between the centre line 3 and 4 is 1/16".

With the tubes 1 and spacers 2 set up as shown, longitudinal welds are made between each edge of each of the spacers 2 and the adjacent tube 1 by a short circuit technique. In this, currents of the order of 200 amps. at voltages of 18–20 arc volts are used. An electrode extension of between ½" and ¾" is suitable and a suitable rate at which the welds may be made is 36 inches per minute. The welds made by the short circuit technique are not deeply penetrating and the distortion that they are liable to produce is small. To minimize the distortion, the welds may be made in groups, a central group being made first and subsequent groups made alternately on opposite sides of the centre group.

Suitable apparatus by which the groups of welds may be made is shown and described in our co-pending U.S. application No. 330,971 and by means of this apparatus, welds can be made simultaneously at the edges of three spacers to join four tubes together. Using this apparatus, a central group of four tubes is welded together. The next three tubes, forming a second group, lying at one side of this first group and separated therefrom by three tubes, are then welded together by a single pass of the welding apparatus and the three tubes on the other side of the first group, that are separated from the first group by three tubes and which form a third group, are then welded together by a further single pass of the welding apparatus. This procedure is followed until the edges of the array are reached when the tubes lying between the welded groups are then welded together and to the group between which they lie.

When all the welds on the top side of the panel have been completed, it is reversed and welds are made on the other side by a spray transfer technique. This produces a stronger weld than the short circuit technique but is more deeply penetrating. The risk of burn through is, however, eliminated by the weld metal deposited by the short circuit technique. The spray transfer technique is effected with larger currents and voltages, in the order of 400–500 amps. and 24–27 arc volts respectively, a higher speed and a smaller electrode extension. A suitable speed is about 60 inches per minute and a suitable electrode extension is between ½" and ¾". The apparatus shown and described in said co-pending application No. 330,971 may also be used to carry out the spray transfer technique and preferably the order in which the welds are effected is the reverse of that in which they were effected on the first side.

As a result of displacing the central line of the spacers 2 relatively to the centre line of the tubes 1 slightly towards the short circuit welds, the weld beads in the completed panel, after both sides have been welded, lie equally above and below the centre line of the tubes 1 and this tends to minimize the transverse distortion of the panel. It may, in some circumstances, be found desirable to use clamps to reduce still further any tendency of the panel to bow laterally during the spray transfer welding.

I claim:
1. The method of making a gas-tight integral tube panel composed of a plurality of substantially parallel tubes, said method comprising the steps of uniting said tubes into a panel by utilizing a short circuit gas shielded metal arc welding process to form seal welds between and along the tubes, inverting the panel and thereafter utilizing a spray transfer gas shielded metal arc welding process to form strength welds between and along the tubes with the strength welds being formed at a heat input substantially greater than that involved in forming the seal welds.

2. The method of making a gas-tight integral tube panel composed of a plurality of substantially parallel tubes integrally united by metal strips interposed between the tubes, said method comprising the steps of arranging at least a pair of relatively elongated metal tubes in spaced substantially parallel relation, disposing a relatively elongated metal strip between said pair of tubes with its side edges substantially adjacent the tube surfaces, uniting said tubes to said strip by utilizing a short circuit gas shielded metal arc welding process to form seal welds between the tubes and strip to seal the intertube space gas-tight, inverting the panel and thereafter utilizing a spray transfer gas shielded metal arc welding process to form strength welds between the tubes and strip with the strength welds being formed at a heat input substantially greater than that involved in forming the seal welds.

3. The method of making a gas-tight integral tube panel composed of a plurality of substantially parallel tubes integrally united by metal strips interposed between the tubes, said method comprising the steps of arranging a plurality of relatively elongated metal tubes in spaced substantially parallel relation, disposing a relatively elongated metal strip between each pair of tubes with its side edges substantially adjacent the tube surfaces, uniting said tubes to said strips by utilizing a short circuit gas shielded metal arc welding process to form seal welds between the tubes and strips to seal the intertube space gas-tight, inverting the panel and thereafter utilizing a spray transfer gas shielded metal arc welding process to form strength welds between the tubes and strips with the strength welds being formed at a heat input substantially greater than that involved in forming the seal welds.

4. A method as claimed in claim 1 in which the welds made by the short circuit process are formed in groups, the welds of one group being made first and the welds in the remaining groups being subsequently made alternately on each side of the first group.

5. A method as claimed in claim 4 in which the welds made by the spray transfer process are also made in groups effected in the reverse order to the groups of welds made by the short circuit process.

6. A method as claimed in claim 3, in which the center line of the strips is displaced from the center line of the tubes towards the side of the panel at which the seal welds are made.

7. A method as claimed in claim 3 in which the center line of the spacers is displaced from the center line of the tubes towards the side of the panel at which the seal welds are made and in the completed panel the height of the beads of weld material on opposite sides of the center line of the tubes from this center line are substantially equal.

References Cited by the Examiner

UNITED STATES PATENTS

| 2,504,868 | 4/1950 | Muller et al. | 219—130 |
| 2,886,696 | 5/1959 | Tuthill et al. | 219—137 |
| 2,993,983 | 7/1961 | Carpenter et al. | 219—124 |

FOREIGN PATENTS

| 118,221 | 6/1930 | Austria. |
| 725,424 | 2/1932 | France. |
| 357,062 | 9/1931 | Great Britain. |

RICHARD M. WOOD, *Primary Examiner.*